United States Patent [19]

Ekman

[11] 4,005,847
[45] Feb. 1, 1977

[54] CONNECTION VALVE

[76] Inventor: Bror Thure Fridolf Ekman, Slalamvagen 12, 54100 Skovde, Sweden

[22] Filed: July 9, 1974

[21] Appl. No.: 486,753

Related U.S. Application Data

[63] Continuation of Ser. No. 210,483, Dec. 21, 1971, abandoned.

[30] Foreign Application Priority Data

Dec. 23, 1970  Sweden ............................ 17529/70

[52] U.S. Cl. .................................. 251/148; 73/420; 251/214
[51] Int. Cl.² ................... F16K 51/00; F16L 29/00
[58] Field of Search ....... 251/214, 142, 148, 149.1, 251/149.6, 321, 339, 291, 118–127; 137/321, 322, 227, 228, 229, 170.1, 224; 73/420

[56] References Cited

UNITED STATES PATENTS

| | | | |
|---|---|---|---|
| 1,789,964 | 1/1931 | Buehrer | 251/339 X |
| 2,013,846 | 9/1935 | Borel | 137/224 |
| 2,739,612 | 3/1956 | Hansen | 251/291 X |
| 2,958,219 | 11/1960 | McIntyre et al. | 73/420 X |
| 3,139,902 | 7/1964 | Thomas | 137/224 X |
| 3,280,834 | 10/1966 | Zahuranec | 251/149.6 X |
| 3,443,789 | 5/1969 | Glasgow et al. | 251/214 |
| 3,645,496 | 2/1972 | Rawlins | 137/322 X |

Primary Examiner—William R. Cline
Attorney, Agent, or Firm—Ulle C. Linton

[57] ABSTRACT

Connection valve for the temporary connection of equipment to conduit systems for pressure fluids, which valve has at least one terminal valve attachable to the conduit systems and including a normally closed spring pressed check valve, a control valve, quick coupling means detachably connecting said terminal valve to said control valve and said control valve having an adjustable prismatic pin having a space therearound and engageable with said check valve for opening the same as desired providing communication for fluids between said terminal valve and said space around said pin in said control valve and said control valve having a side outlet communicating with said space around said pin for receiving fluid therefrom.

2 Claims, 1 Drawing Figure

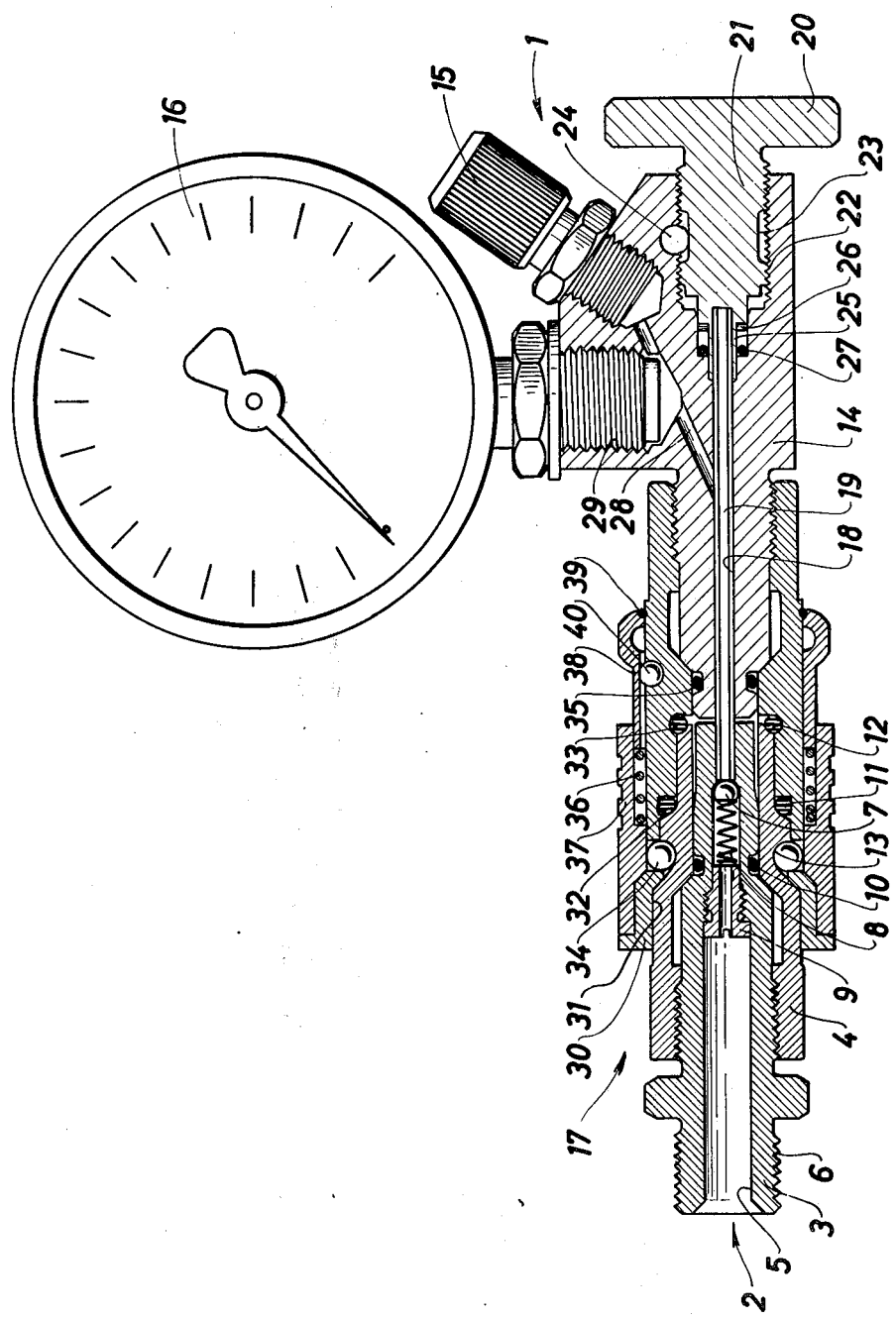

CONNECTION VALVE

CROSS REFERENCE TO RELATED APPLICATION

The present application is a continuation of my copending application Ser. No. 210,483 filed Dec. 21, 1971, now abandoned.

BACKGROUND OF THE INVENTION

The present invention relates to connection valves for the temporary connection of equipment to conduit systems for pressure fluids including at least one terminal valve including a normally closed check valve and provided with a valve body self-sealing against a seat by means of a force from a spring and with an outer part provided to seal against the control valve which provides an element in the form of a pin and arranged to force the valve body to lift from the seat when the control valve is attached to the terminal valve whereby a connection between the two valves is opened.

For example pneumatic tires represent an art of such closed pressure systems to which it is not suitable to arrange a permanent measuring device, charging device for the fluid or valves for discharge of the same. Contrary thereto, such devices have to be connected temporarily for checking and correcting the pressure and filling and discharging the system. It is also common to arrange a simple valve for connecting separate measure-, filling- and discharging devices. Such valve usually is arranged as a system closing check valve comprising a spring loaded self closing ball or similar valve body. A connection valve belonging to said separate equipment is provided for being connected to said valve belonging to the system and besides sealing elements, has a pin which displaces said valve body inwardly by connection of the connection valve which displacement opens a free connection between the pressure system and the separate equipment. In this way measuring and discharging of the system can be made without influence from the check valve. Such known connection valve arrangements have, however, the character of simple embodiments and are not intended for qualified purposes and higher pressures. Thus the ball is forced inwards and opens thereby the connection between the systems and the equipment immediately when the connecting valve is forced against the terminal valve.

OBJECTS OF THE INVENTION

An object of the present invention is to provide a control valve which like the above mentioned before known connection valves, is intended to be connected to a closed pressure system by means of a terminal valve provided with a check of the kind mentioned which control valve is intended to be used even with the system with very high pressure where the requirements of sealing conditions and protection against escape of medium are very high.

The object of the invention are obtained through a control valve in which the element in the form of a pin is provided to be moved between a position in which the check valve body is unaffected and, when the control valve is connected in the intended way, a position in which the check valve body is forced to an open position by means of a threaded control rod which is arranged to be screwed thereby moving the element between said two positions.

BRIEF DESCRIPTION OF THE DRAWING

On the enclosed drawing an embodiment of the connection valve according to the invention is shown in a central section. The embodiment is described in the following.

DESCRIPTION OF THE PREFERRED EMBODIMENT

The drawing shows the control valve 1 and terminal valve 2 permanently connected to a closed fluid system. The terminal valve 2 comprises an inner nipple 3 and an outer nipple 4. The nipple 3 has a passage 5 in connection with the system and a thread 6 for the attaching of the nipple to a conduit, a tank or the like of the system. In the passage 5 a check valve is arranged to open in a direction inwardly of the system and comprises a ball 7 intended to cooperate with a valve seat, a pressure spring 8 acting against the ball 7 and a hole screw 9 forming a rest for the spring 8. The outer nipple 4 is screwed on the nipple 3 which is sealed by means of an O-ring 10 and by its outer end having sealing surfaces 11 and 12 and an annular locking surface 13, which purpose will be explained hereinafter.

The control valve 1 comprises a valve body 14 with a ventilating valve 15, a measuring instrument 16 of a suitable type and a quick coupling 17. The valve housing 14 has a longitudinal bore 18 forming a continuation to the passage 5 of the terminal valve 2 with an actuating pin 19 therein which is provided with a transversal hole, made with a smaller diameter than said bore or, as shown, prismatical while the bore is cylindrical. The actuating pin 19 is connected to a threaded control rod 21 provided with a handle wheel 20 and screwed in the valve housing 14. The thread 22 of the control rod has an annular groove to cooperate with a pin 24 which will prevent the control rod from being screwed out from the valve housing 14 unexpectedly. The inner end of the control rod facing the actuating pin 19 is provided with a recess for the same and has nose 25 around which is placed a polytetrafluorethylen ring 26 and an O-ring 27, intended to seal against a corresponding seat.

To the bore 18 an inclined bore 28 is connected leading to the ventilating valve 15 and to a space at the bottom of an attaching thread 29 for the instrument 16.

The quick coupling 17 is formed of an inner nipple 30 screwed on the valve housing 14 with an inner recess 31 mating with the nipple 4 of the terminal valve 2 and two O-rings 32 and 33 against sealing surfaces 11 and 12, respectively, and a number of locking balls 34 in holes in inner nipple 30 which are prevented from falling into the recess 31 by means of an upsetting at the edges of the holes for the balls 34. The nipple 30 is seated against the valve body by means of an O-ring 35 and on the nipple 30 there is provided an axially displaceable handle sleeve 37 which is under pressure from a spring 36. The sleeve 37 has two inner diameters by means of which it, in a certain axial position, is holding the balls 34 in an inwardly pressed position and in another axial position is giving them a certain play for an outwards movement. The sleeve is, under influence from the spring 36, forced to be in the first mentioned axial position. The spring 36 is resting on a second sleeve, the securing sleeve 38, which movement in the direction from the spring 36 is limited by a locking ring 39 placed in a groove in the sleeve 30. The securing sleeve 38 can be moved to a position close to the sleeve 37 and can be locked in this position by means of a kind of bayonet clutch whereby the sleeve 38 cooperates with a ball 40 placed in a shallow boring in the sleeve 30.

The ventilating valve 15 shown in the drawing can be replaced for example by a faucet or a valve intended for connection of a hose. The latter arrangement is suitable if the control valve should be used for discharge of a system which contains a medium other than air. The measuring instrument 16 is shown as a pressure gauge but can also be of another kind, for example a registrating instrument.

The valve will work in the following way: The system or the systems, intended to be used in control with the connection valve is to be provided with terminal valves 2 at suitable measuring points. In each of these valves 2 the ball 7 normally rests against its seat under the influence of spring 8 and the system is closed at the measuring points.

In use, the control valve 1 is connected by means of the quick coupling 17 with the sleeve 30 of the same placed on the nipple 4 whereby the handle sleeve 37 can be drawn backwards so that the balls 34 have enough play to pass over the coarser part of the nipple 4 and into the groove 13. The O-ring 32 and 33 are now resting against their respective sealing surfaces 11 and 12 through which a completely tight connection between the terminal valve 2 and the control valve 1 is reached. The securing sleeve 38 is now to be moved towards the spring 36 and locked by the ball 40 through turning. The handle sleeve 38 which under the action of the spring 36 is in its outer position is now locked in this position by means of the compression of the spring 36 between the sleeves 37 and 38. The control rod 21 has to be in its outer position for connection of the valves and it has to be screwed inwards by means of the handle 20 when one wants to bring the fluid in the system in connection with the connection valve. Hereby the pin 19 is forced inwards and lifts the ball 7 from its seat and the fluid can flow through the bore 18 where a space is present between the cylindrical bore wall and the prismatical pin 19 or alternatively, at a bored pin 19, through its hole. The control rod 21 is sealed by means of the O-ring 27 which prevents the fluid from reaching the screw thread 22. At the outer position of the control rod 21 and by its movement the O-ring acts as a radial sealing usually used by moved parts but when the control rod 21 has reached its innermost position the ring acts as an immobile axial radial sealing with the O-ring 27 squeezed by the polytetrafluorethylan ring 26, the very low material friction of which causes it to rotate against the axial surface of the control rod so that the O-ring 27 under the last part of the screwing moment will not be worn. The control rod 21 is intended to be screwed into its innermost position during the period in which the valve is used whereby the safer immobile sealing can be used during the relatively long measure period. Contrary, during the relatively short moments for out- and inscrewing, during which the check valve is partly open, the lesser safe mobile sealing type is used.

From the bore 18 the fluid is directed through the inclined channel 28 to the ventilating valve and the measuring gauge 16. In order to reach an accurate measure result the control valve is to be ventilated through the ventilating valve before the measurement. As mentioned the system also can be charged or discharged if the ventilating valve 15 is replaced by a suitable valve. After the finish of the measurement the control rod 21 is screwed outwardly whereby the ball 7 closes against its seat under the influence of the spring 8. The securing sleeve 38 is now to be moved to its in the drawing shown backwards position. The handle sleeve 37 is thereafter to be drawn backwards so that the balls 34 are free to move out of the groove and the connection valve 1 can be removed. Because the main part of the passage through the control valve is formed with a small space between the pin 19 and the bore 18, a very small amount of fluid is lost at every connection of the valve.

The described and shown embodiment is only an unlimited example and can be changed to its details. For example the mentioned O-rings can be replaced by other kinds of sealing elements, e.g. sealing rings with X-profile.

I claim:

1. Connection valve for the temporary connection of equipment to a conduit system for pressure fluids comprising at least one terminal valve attachable to the conduit system and having an axial bore, a check valve being positioned in said bore and having a normally closed spring pressed valve member capable of being opened only when said valve member is moved towards the conduit system, a control valve having an end portion detachably positioned and connected against said terminal valve and having a bore in line with said terminal valve bore, said control valve having a second bore extending on a slant from said first control valve bore, a pin slideably mounted along most of its length in said first control valve bore and extending from said control valve end portion into said terminal valve bore to said check valve member, adjustable means closing the other end of said control valve and being connected to said pin for moving the same longitudinally for at times opening said valve member, said pin being prismatic, the walls defining said control valve first bore being cylindrical and tightly encircling the edges of said prismatic pin along its length at least between said control valve end portion and said control valve second bore with a space of small volume extending between the sides of said pin and said walls, quick coupling means mounted on said terminal valve and said control valve detachably connecting said valves, said control valve other end having a stepped recess with the outer portion of said recess being threaded and inner portions of successively smaller diameters, said adjustable means having a stepped periphery with a portion being in threaded engagement with said recess threaded portion and further portions slideably extending in said recess inner portions, an annular elastic sealing element being positioned around an inner portion of said adjustable means periphery between a step thereof and a step of said stepped recess whereby movement of said adjustable means inwardly of said stepped recess causes a squeezing of said sealing element and outward movement of said adjustable means allows said sealing element to provide a radial sealing between said adjustable means and said control valve.

2. Connection valve as claimed in claim 1 including at least one guiding element having a low coefficient of friction and positioned between said adjustable means inner portion and said control valve for guiding said adjustable means inner portion during the sliding movement thereof.

* * * * *